Nov. 2, 1926.  
S. G. MEWBORN  
ANTIGLARE SHIELD  
Filed March 16, 1926

1,605,682

Inventor  
Sidney G. Mewborn,  
By  
Attorney

Patented Nov. 2, 1926.

1,605,682

UNITED STATES PATENT OFFICE.

SIDNEY G. MEWBORN, OF WILSON, NORTH CAROLINA.

ANTIGLARE SHIELD.

Application filed March 16, 1926. Serial No. 95,079.

My invention relates to an anti-glare device for use upon an automobile or like vehicle.

Important objects of the invention are to provide a device of the above mentioned character, which will prevent the light from an approaching automobile blinding the driver, to provide a device of the above mentioned character which is extremely simple in construction, cheap to manufacture, and convenient in use; to provide a device of the above mentioned character whereby the antiglare screen may be adjusted to a selected elevation, in use.

Other objects and advantages of the invention will be apparent during the course of the following description.

Figure 1:
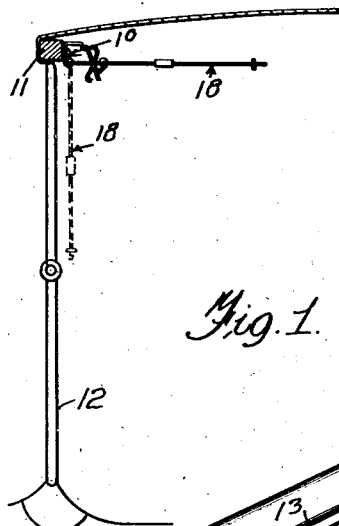
Figure 2:
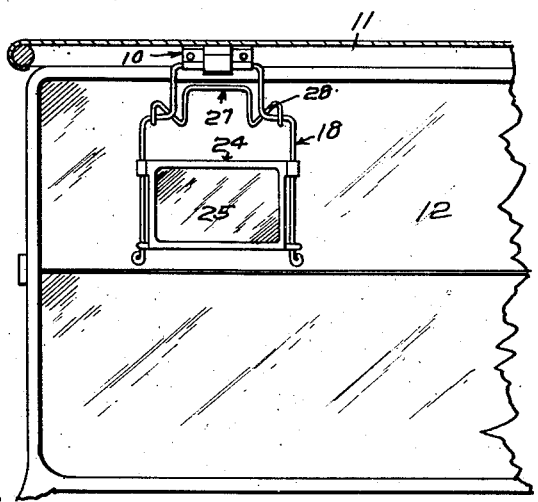
Figure 3:
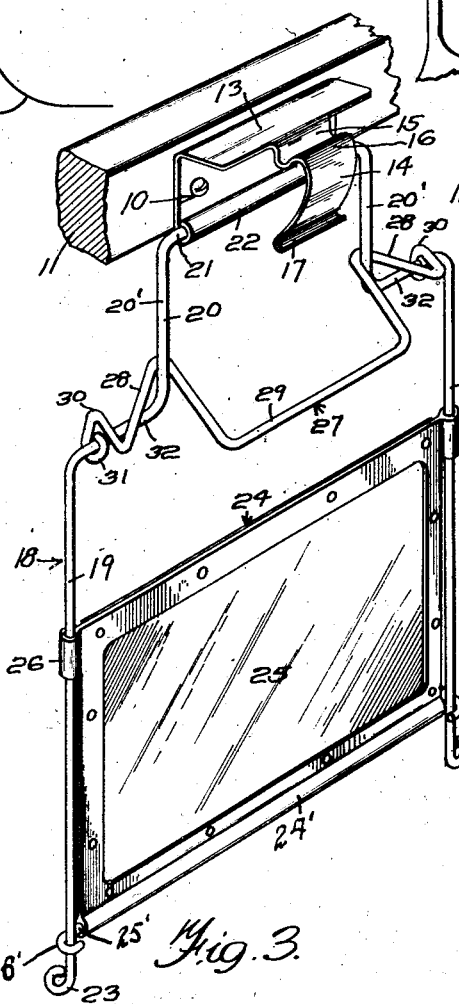
Figure 4:
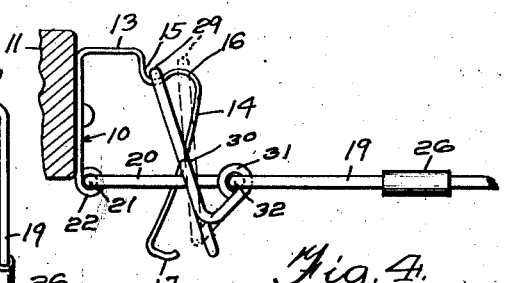
Figure 5:
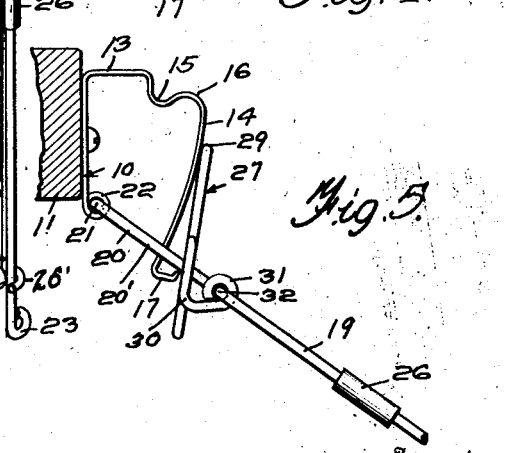

In the accompanying drawings, forming a part of this specification and in which like numerals are employed to designate like parts throughout the same, Figure 1 is an edge elevation of the device, showing the same applied to an automobile, Figure 2 is a side elevation of the same, Figure 3 is a perspective view of the device, Figure 4 is an edge elevation of the latch included in the device, and associated elements, showing the latch in the holding position, Figure 5 is a similar view showing the latch partly raised and gravitating to the vertical position.

In the drawings, wherein for the purpose of illustration, is shown a preferred embodiment of my invention, the numeral 10 designates an attaching plate or support, which may be rigidly secured to the front bar or strip 11 of an automobile, upon the inner side of the windshield 12, as shown. This attaching plate is bent at its top into a horizontal flange 13, carrying a resilient latch tongue 14, preferably integral therewith. This latch tongue is provided at its top with a depression, forming a groove 15 and a rounded shoulder 16. At its lower end, the tongue 14 has a flange or lip 17.

The numeral 18, designates a main frame, which may be formed of wire or other suitable material. This frame is generally U-shaped, and includes sides 19, connected by a U-shaped transverse portion 20, including a horizontal portion 21 and vertical slides 20'. The portion 21 is pivoted within a sleeve or knuckle 22, formed upon the bottom of the attaching plate. At their lower ends the sides 19 may be bent into eyes 23, constituting stops.

The numeral 24 designates a supplemental frame, formed of metal or other suitable material, and carrying a sheet or pane 25 of anti-glare material, which is preferably green or any other suitable color. The sheet 25 may be formed of celluloid, glass, or any suitable translucent material. The supplemental frame 24 is provided at its upper corners with knuckles 26, which receives the sides 19, and have slidable frictional engagement therewith. At its bottom the frame 24 has a horizontal sleeve 24', receiving a stiffening rod 25', the ends of which are bent into eyes 26', slidably receiving the sides 19. The supplemental frame is longitudinally adjustable upon the main frame, and the frictional engagement between the knuckles 26 and the sides 19 is sufficient to retain the supplemental frame in the selected longitudinal position upon the main frame. If desired, additional clamping means might be employed at the knuckles 26.

Co-acting with the latch tongue 14 is a U-shaped latch 27, provided at its ends with angularly arranged extensions 28, which diverge from the sides of the U-shaped latch in the direction of its transverse portion 29. These angularly arranged extensions 28 are bent into shoulders 30, carrying eyes 31, which are freely pivoted upon horizontal shoulders 32 of the main frame. The angular extensions 28 form with the sides of the U-shaped latch, V-shaped pockets, which receive the slides 20', as shown, thereby limiting the downward movement of the latch, when the main frame is shifted to the lowered vertical position. When the main frame is raised, the transverse portion 29 of the U-shaped latch is shifted to a position forwardly of the eyes 31, and hence this latch gravitates to a substantially vertical position, and slidably engages the curved face of the latch tongue 14.

The operation of the device is as follows:

When the device is not in use, it is shifted to the upper horizontal position, Figure 1, and the transverse portion 29 of the U-shaped latch 27 will gravitate into the recess or groove 15, and hence the main frame is locked in the upper horizontal position. When it is is desired to use the device, the operator places his thumb or finger upon the lip 17, and draws the latch tongue 14 forwardly and downwardly, the same yielding sufficiently, whereby the rear wall of the recess 15 approaches the horizontal, sufficiently, to release the transverse portion 29, while the recess is bodily lowered. The main frame 18, therefore, gravitates to the lowered vertical position, and the latch will automatically swing rearwardly to the position slightly below the horizontal.

It is to be understood that the form of my invention, herewith shown and described, is to be taken as a preferred example of the same, and that various changes in the shape, size and arrangement of parts may be resorted to without departing from the spirit of my invention or the scope of the subjoined claims.

Having thus described my invention, I claim:—

1. An anti-glare device for automobiles or the like, comprising a frame, a sheet of antiglare material carried by the frame, means to pivotally connect one end of the frame with a portion of the automobile so that the frame may be swung substantially vertically, a bodily relatively stationary resilient latch tongue having a shoulder arranged near the pivoted end of the frame, and a latch pivotally mounted upon the frame to move therewith and turn with relation thereto, and having a part to engage with the shoulder, the shoulder of the latch tongue releasing the latch upon the latch tongue being depressed.

2. An anti-glare device for automobiles or the like, comprising a frame, a sheet of antiglare material carried by the frame, means to pivotally connect the frame with a portion of the automobile, a movable latch element secured to the automobile near the pivot of the frame, and a U-shaped latch pivoted upon the frame to move therewith and to turn with relation thereto and adapted to engage with the movable latch element.

3. An anti-glare device for automobiles or the like, comprising a frame provided at one end with shoulders and a U-shaped end carried by the shoulders, a U-shaped latch provided at its ends with extensions forming sockets to receive the sides of the U-shaped end, said extensions having eyes pivoted upon the shoulders, means for pivotally connecting the bottom of the U-shaped end with a portion of an automobile, a resilient tongue arranged near the pivot means and having a shoulder to engage with the U-shaped latch, and an anti-glare screen carried by the frame.

4. An anti-glare device for automobiles or the like, comprising a frame, a sheet of antiglare material carried by the frame, means to pivotally connect the frame with a portion of the automobile, a bodily relatively stationary latch tongue which is longitudinally curved and extends downwardly, said latch tongue being provided near its upper end with a groove forming a shoulder, and a generally U-shaped latch pivotally mounted upon the frame to move therewith and to turn with relation thereto and also adapted to engage with the curved latch tongue and to be guided thereby into the groove of the same behind the shoulder, the latch disengaging the shoulder when the free end of the latch tongue is depressed.

5. An anti-glare device for automobiles or the like, comprising an attaching plate carrying a tongue having a socket, a U-shaped suspension member pivotally connected with the attaching plate, a frame carried by the U-shaped suspension member, a sheet of antiglare material carried by the frame, and a U-shaped latch carried by the frame and adapted for detachable engagement within the socket of said tongue, said U-shaped latch and U-shaped suspension member having relative pivotal movement.

6. An anti-glare device for automobiles or the like, comprising a support having a socket, a U-shaped suspension member pivoted upon the support, a frame carried by the suspension member, a sheet of antiglare material carried by the frame, a U-shaped latch carried by the frame and arranged within the U-shaped suspension member and adapted to be inserted within said socket and to be removed therefrom, the U-shaped latch and U-shaped suspension member having relative pivotal movement.

In testimony whereof I affix my signature.

SIDNEY G. MEWBORN.